United States Patent [19]

Barthel

[11] 4,222,988

[45] Sep. 16, 1980

[54] APPARATUS FOR REMOVING HYDROCARBONS FROM DRILL CUTTINGS

[75] Inventor: Horst K. F. Barthel, Hamburg, Fed. Rep. of Germany

[73] Assignee: Oil Base Germany G.m.b.H., Hamburg, Fed. Rep. of Germany

[21] Appl. No.: 903,304

[22] Filed: May 5, 1978

[51] Int. Cl.[3] ........................ B01D 17/00; C10G 1/02; B02C 13/06

[52] U.S. Cl. ....................................... 422/309; 175/66; 196/121; 196/124; 202/105; 202/136; 219/469; 241/238; 422/900

[58] Field of Search ..................... 201/7, 8, 35, 10, 11; 202/136, 105; 175/5, 66, 206; 196/155, 112, 124, 121; 48/61, 197 R; 241/67, 220, 238; 219/325, 378, 469–471, 523; 134/105; 422/309, 900

[56] References Cited

U.S. PATENT DOCUMENTS

| | | | |
|---|---|---|---|
| 1,177,727 | 4/1916 | Smith | 201/8 |
| 1,296,367 | 3/1919 | Cochran | 202/136 |
| 1,657,815 | 1/1928 | Bates | 201/8 X |
| 1,696,730 | 12/1928 | Reed et al. | 201/8 |
| 1,936,025 | 11/1933 | Mahaffey . | |
| 2,792,339 | 5/1957 | Rich | 202/136 X |
| 3,105,133 | 9/1963 | Norton | 219/469 |
| 3,999,602 | 12/1976 | Fewell et al. | 165/104 M X |
| 4,084,521 | 4/1978 | Herbold et al. | 201/35 X |
| 4,094,769 | 6/1978 | Brown | 201/7 X |

*Primary Examiner*—Arnold Turk

*Attorney, Agent, or Firm*—Fulbright & Jaworski

[57] ABSTRACT

Method and apparatus for removing hydrocarbons from drill cuttings is disclosed. The method involves heating the contaminated drill cuttings at a pressure lower than atmospheric pressure, milling the cuttings to expose hydrocarbons trapped within agglomerates of the material, and separating the vapors thereby produced from the cuttings. The cleaned cuttings can be used or disposed of without damage to the environment. The vaporized hydrocarbons may be condensed and recovered.

3 Claims, 3 Drawing Figures

APPARATUS FOR REMOVING HYDROCARBONS FROM DRILL CUTTINGS

BACKGROUND OF THE INVENTION

The instant invention concerns the removal of hydrocarbon values from drill cuttings which have been contaminated with hydrocarbons.

During rotary drilling operations, a volume of the subterraneous material encountered is removed to provide the well bore. This material is generally referred to as drill cuttings. The cuttings are usually mixed with the drilling fluid used and any water or hydrocarbons encountered subterraneously during drilling operations.

In a typical drilling operation, the cuttings are separated from the drilling fluid by way of a shale shaker. The recovered drilling fluid is usually recirculated for further use in the drilling operation. The cuttings removed by the shale shaker are not only coated with but contain a mixture of water, hydrocarbons and constituents of the drilling fluid. In some cases, the drilling fluid itself may contain hydrocarbons which contribute to the contamination of drill cuttings.

When the drilling operation takes place onshore, the disposal of cuttings does not generally present a difficulty. Often times the cuttings are used as landfill. When drilling operations are undertaken offshore, the disposal of cuttings presents a substantial problem. If the cuttings are simply dumped into the water, a serious pollution problem may be created and the dumping of oil containing cuttings appears to be illegal. The U.S. Department of the Interior in OCS Orders 1-12 has ordered that drill cuttings shall not be dumped into the ocean unless the oil has been removed. Several methods and apparatus have been disclosed for cleaning hydrocarbon contaminated cuttings.

U.S. Pat. No. 3,693,951 discloses a method and apparatus for treating well cuttings which includes a high intensity infrared heating chamber. In this process, the hydrocarbons are combusted.

Chemical processes for treating drill cuttings have been proposed. For example, U.S. Pat. No. 3,860,019 and 3,693,733 disclose a method and apparatus for washing drill cuttings by use of a detergent circulatory system. In addition to the chemical treatment disclosed in those patents, other chemical processes are known. For example, the Brant Company presently commercializes a drill cuttings unit which employs a chemical process to clean drill cuttings.

Other methods of cleaning drill cuttings have been proposed or used. For example, cuttings have been placed in a high temperature retort and heated to a temperature sufficient to combust the hydrocarbons contaminating the cuttings. This process is not practical because of the materials handling problem created and because of the high level of energy required to combust the hydrocarbons.

While several methods for cleaning hydrocarbon contaminated drill cuttings are known, these methods have their disadvantages. For example, in those methods which require chemical treatment, storage and disposal of the chemicals would appear to be a problem. Also, chemical treatments do not fully remove all hydrocarbons from the cuttings and in some cases the chemicals may be more damaging to the environment than the hydrocarbon they remove. Some of the methods would appear to be economically unsound because of the high energy requirement. Other methods would appear to be impractical for use in treating drill cuttings offshore because the equipment required can not be contained in a compact unit. Moreover, none of the methods disclose a relatively simple manner of removing and recovering substantially all hydrocarbon values from the contaminated material and producing a clean material having negligible quantities of hydrocarbons.

It would therefore be advantageous to provide an apparatus and method for cleaning oil contaminated drill cuttings which is energy efficient, does not require the addition of chemicals, is relatively compact, removes substantially all of the hydrocarbons contaminating the cuttings and provides for the recovery of the hydrocarbons values removed from the contaminated material.

SUMMARY OF THE INVENTION

This invention relates to an apparatus and a method for the removal of hydrocarbon values from drill cuttings. In accordance with this invention substantially all hydrocarbons may be removed from drill cuttings leaving only negligible quantities on the cuttings. The apparatus includes a pressure vessel which is adapted for the introduction of and for the removal of hydrocarbon contaminated drill cuttings. The apparatus includes a means to reduce the interior pressure of the pressure vessel and also includes a means to heat the interior of the vessel to a temperature sufficient to vaporize substantially all of the hydrocarbons contaminating the drill cuttings. The apparatus also includes milling means within the pressure vessel for shearing agglomerates of the drill cuttings in order to expose any hydrocarbons which may be trapped or contained within the agglomerates. Additionally, the apparatus includes an exit port for the removal of vaporized hydrocarbons. The apparatus may also include a grinding pump which both grinds the drill cuttings and conveys them to the pressure vessel for removal of the hydrocarbon values.

The method of this invention provides a novel manner in which to remove hydrocarbon values from drill cuttings. The method includes heating the contaminated material in a heating zone at a pressure less than atmospheric to a temperature sufficient to vaporize substantially all of the hydrocarbon contaminant. The method also involves milling the hydrocarbon contaminated cuttings during at least a portion of the heating step in order to shear agglomerates of the cuttings and thereby expose any hydrocarbons which are contained within those agglomerates. In accordance with the method, the hydrocarbon vapors produced are removed from the heating zone. The method of this invention may also include milling of the contaminated cuttings before the heating step.

BRIEF DESCRIPTION OF THE DRAWINGS

The invention will be more fully understood and appreciated from the following detailed description of a preferred embodiment thereof taken in connection with the accompanying drawings, in which.

DESCRIPTION OF THE PREFERRED EMBODIMENTS

Figure 1:
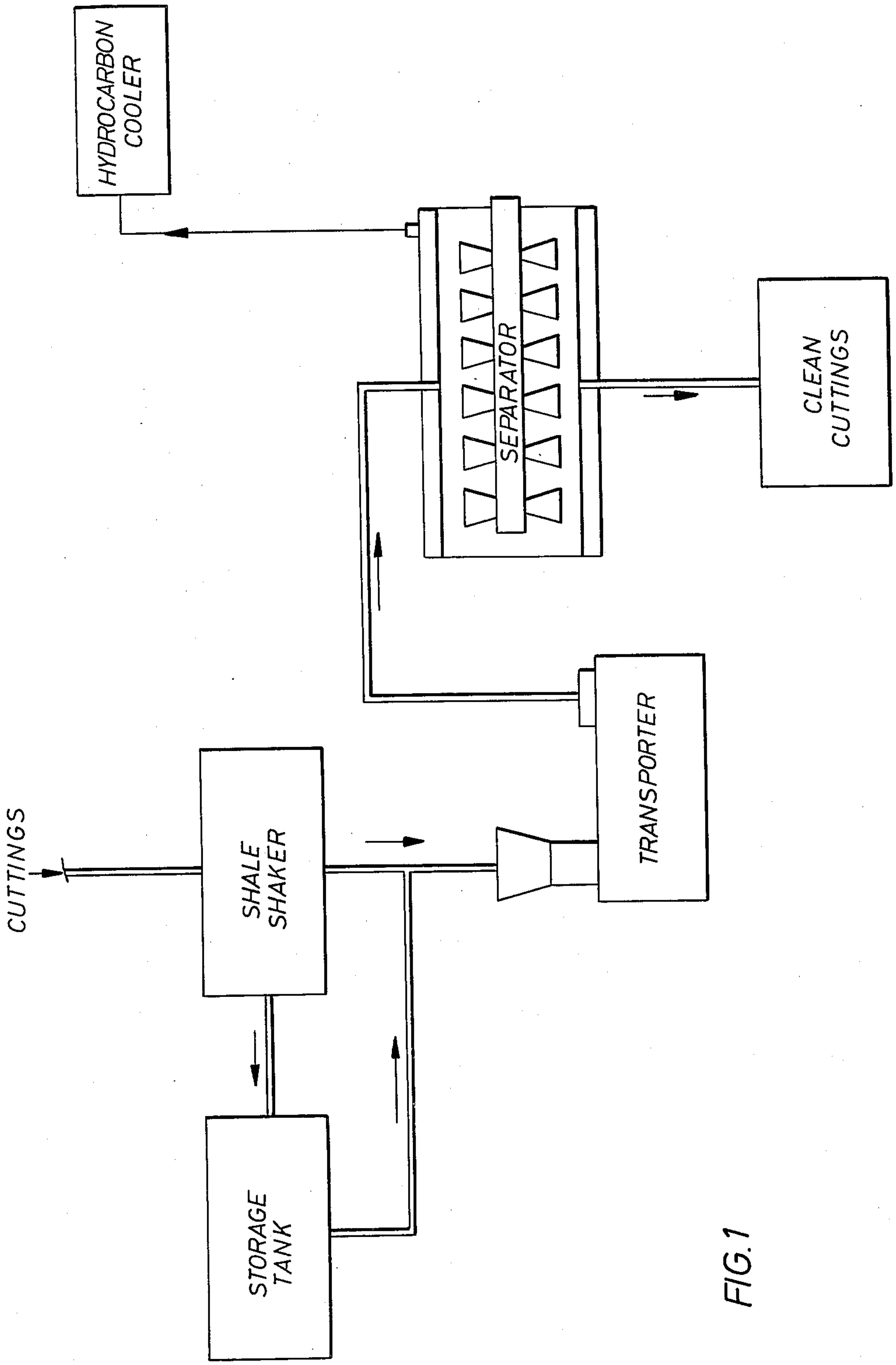
FIG. 1 is a simple schematic of one embodiment of the method of this invention.

Throughout the following description, similar reference numerals refer to similar elements in all figures of the drawings.

Referring to FIG. 1, drill cuttings from a rotary drilling operation are conveyed to a shale shaker. The cuttings separated from the drilling fluid may be conveyed to a storage tank or pit and then conveyed to the transporter shown or they may be directly conveyed to the transporter depending on the rate at which the cuttings are produced.

In the preferred embodiment, the transporter comprises a screw conveyor of any suitable conventional type and a GORATOR pump. The particular GORATOR pump contemplated for use in the preferred embodiment is described in paragraphs 2.3.1, 2.3.4 and 2.3.5 of a German language commercial GORATOR brochure, which brochure is incorporated herein by reference. The GORATOR pump grinds the cuttings prior to their introduction to the separator. Paragraph 2.3.1 of the brochure shows and describes a GORATOR pump with a screw conveyor. Paragraphs 2.3.4 and 2.3.5 show and describe the GORATOR's grinding mechanism. A GORATOR pump of the type usable in accordance with this invention is also described in a German language brochure, V10.00.60 dated December, 1975, which brochure is incorporated by reference. The GORATOR pump used in accordance with this invention should preferably be fitted with a magnetic separator to prevent any metal filings from the grinding bits from entering the cuttings separator unit.

In introducing the cuttings into the separator, it may be found advantageous to pull a vacuum on the separator and thereby facilitate the loading of that vessel. Once the separator is loaded with the cuttings to be cleaned, the entry port is closed and the separator is gradually heated to a temperature of no greater than about 500° F. During the heating step it is preferred to operate the separator at a pressure of approximately 2.2 psia (15.2 kPa) in order to minimize the amount of the energy required to vaporize the hydrocarbons. However, any pressure less than atmospheric can be used but the lower the vacuum, the more time and energy required to remove substantially all the hydrocarbons.

The hydrocarbons vaporized in the separator may be removed via the vacuum line and are cooled by a water cooler which may be a water jacket surrounding a portion of the line through which the vaporized hydrocarbons flow.

The condensed hydrocarbons may be accumulated in a vessel on which a vacuum is pulled. The vessel may have provisions for the separation of water from hydrocarbon such as a sight glass and drain mounted on the vessel or a weir located in the vessel.

During the period of time in which the cuttings are heated, the cuttings should be subjected to a milling action in the separator in order to shear any agglomerates of cuttings to expose hydrocarbons trapped within the agglomerates. The milling action also serves to mix the cuttings.

Once substantially all of the hydrocarbons have been vaporized and removed from the separator, the clean cuttings may be removed from the separator and used for landfill or dumped into the ocean or a body of water without damage to the environment.

Depending upon several factors including the internal pressure of the vessel and the nature of the contaminated cuttings, the point in the process at which time the cuttings are substantially oil free may be determined by the equilibrium temperature of the pressure vessel. For example, cuttings processed in accordance with this invention at an equilibrium temperature of about 500° F. and a pressure of about 1.4 to 2.8 psia (10.1–20.3 kPa) should be substantially oil free.

Other methods may be employed for the purpose of determining when substantially all the hydrocarbons have been removed. For example, the vapor from the vessel may be sampled and run through a gas chromatograph to determine the type and quantity of hydrocarbons in the sample. This data can, though routine experimentation, be correlated to the amount of hydrocarbon remaining on the cuttings. The preferred mode is to operate the pressure vessel at a pressure of about 1.4–2.8 psia (10.1–20.3 kPa) and to raise the temperature to an equilibrium value of about 500° F. At that point, substantially all the hydrocarbons should be removed from the cuttings.

In the preferred embodiment, the apparatus of the invention includes a transporter pump for grinding and conveying the cuttings to the vessel in which they are heated. As previously stated, the transporter includes a screw conveyor and a GORATOR pump. This pump maybe used in combination with the vessel in which the cuttings are heated.

After a first batch has been cleaned, a second batch may be loaded into the separator vessel. This second operation may be initiated without a significant cool down of the heated vessel; however, care must be taken in loading the cuttings into the vessel since the hydrocarbon exposed to a high temperature may flash. This problem may be avoided by operating several of the vessel in series.

In accordance with this invention, the cuttings may be processed for a long or a relatively short period of time depending on many factors including the residual hydrocarbons desired on the cuttings. When a residual carbon content below about 200 ppm is desired the processing cycle may be lengthened depending on the type of cuttings and the temperature of the process.

Also, in accordance with this invention, it should be clear that a continuous milling action may not be required during the heating step. In fact, with some clay type cuttings it may be difficult to continuously mill the material. What must be understood, however, is that at least some milling action is required in order to expose any hydrocarbons trapped within agglomerates of the cuttings. Milling is also required even if the cuttings have been ground prior to heating because the cuttings will tend to agglomerate when heated.

Figure 2:
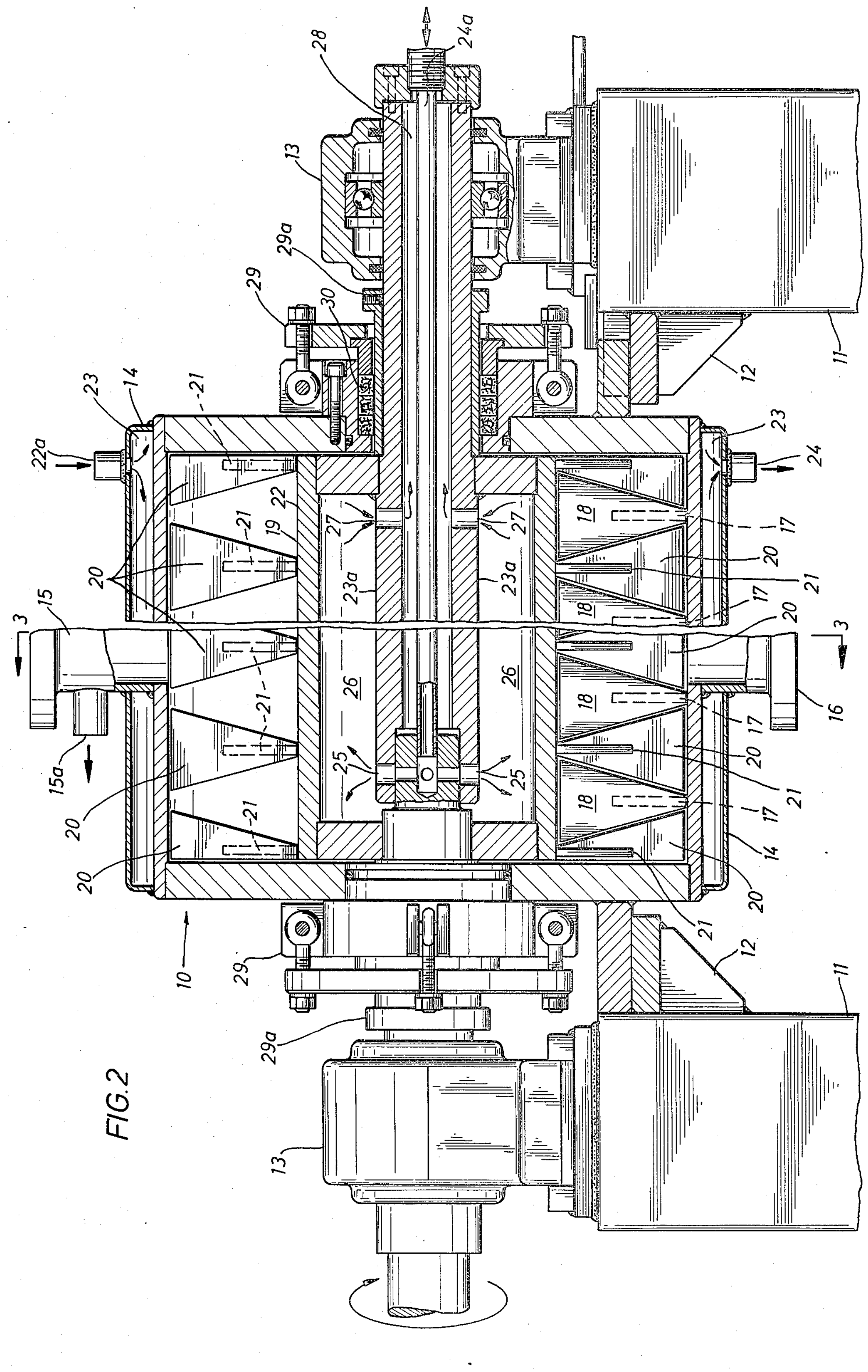
FIG. 2 is a partial sectional view illustrating an apparatus for cleaning contaminated earthy materials embodying the teachings of this invention.
Figure 3:
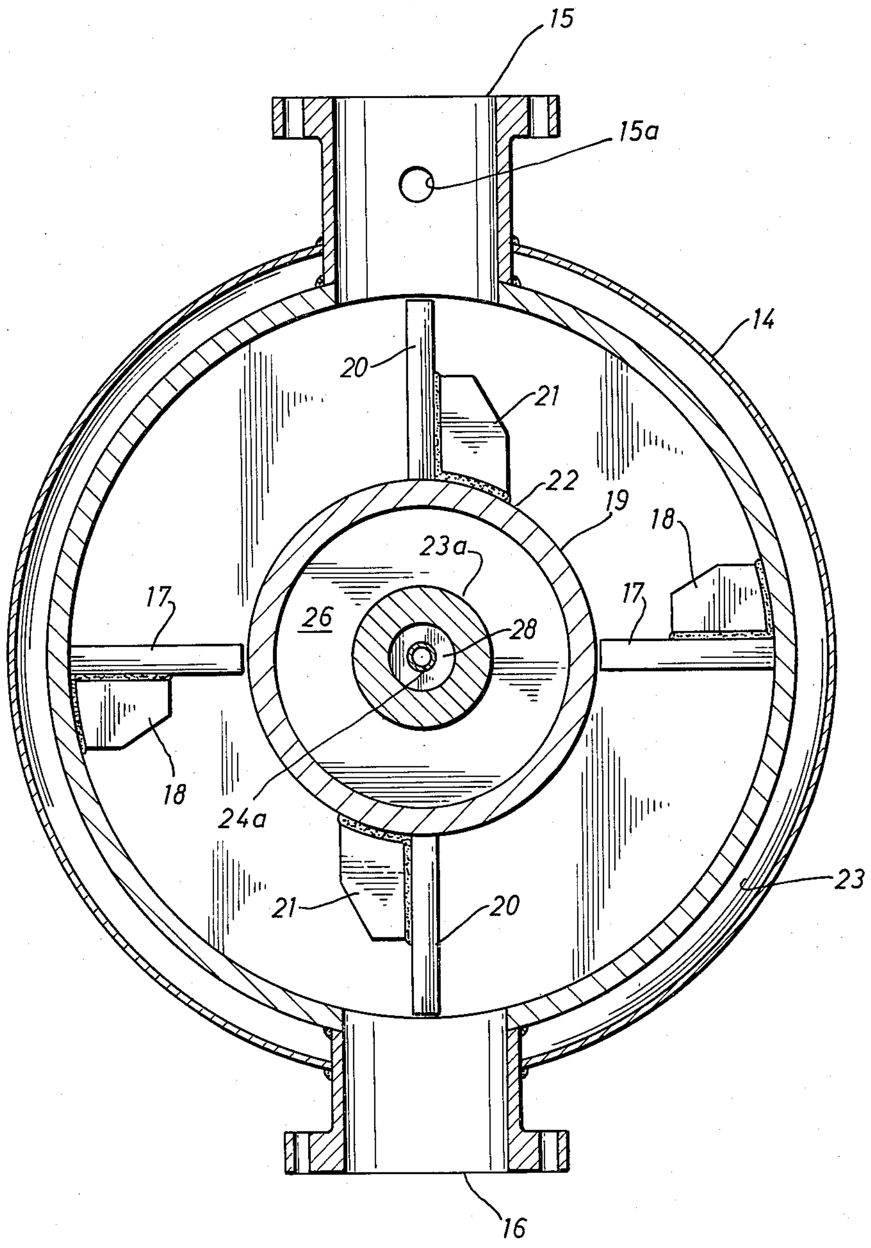
FIG. 3 is a partial section view taken along lines 3—3 of FIG. 2.

Referring to FIGS. 2 and 3 there is illustrated the preferred embodiment of the apparatus of the instant invention, excluding the above referenced transporter. The separator 10 may be supported by supports 11 and 12 as shown. These supports 11 and 12 may be made of any suitable support metal and these supports may be welded to each other. Mounted on supports 11 are bearings 13. The bearings may be of any conventional high temperature type. The bearings may be mounted on these supports by any suitable manner including bolting the bearings to the supports. The supports 12 may be welded or connected in any suitable manner to the jacketed hull 14.

The jacketed hull may be preferably comprised of two members which are adapted to be joined along a mating surface. The members may be joined in a sealed relationship by use of nuts and bolts or any other suitable means. A suitable high temperature vacuum gasket should be interposed between the mating surfaces to provide for a good seal. Outer vanes 17, although shown to be mounted on the bottom of the interior surface of the jacketed hull, may be mounted in straight line, spaced relationship along the entire length or at least a portion of the internal length of the hull. The outer vanes 17 are triangular in shape and are supported by support structures 18 as shown in FIG. 3. Although the vanes are shown in FIG. 2 to be affixed to the bottom of the hull, they may be affixed to the sides of the hull and shown in FIG. 3 or along any other line inside the jacketed hull.

The outer vanes 17 are mounted on the interior surface of the jacketed vessel in a spaced relationship such that any cuttings within the hull are milled when the inner drum 19, on which inner vanes 20 are mounted, is rotated. The inner vanes 20 are of the same triangular configuration as the outer vanes 17, they are supported by similar supports 21, and are spaced on the outer surface of shell 22 in such a manner such that when the inner drum 19 is rotated, the inner vanes pass through the spaces left by the spacing of the outer vanes 17. The milling action may be effected, for example, when the vanes pass within two millimeters of each other.

The vanes mounted on the shell 22 not only mill any material between the other vanes 17, but also mill material caught between the ends of the inner vanes and the interior surface of the jacketed hull 14. This milling or scraping is even more effective if the vane edges are sharply beveled. Similarly, the outer vanes 17 mill material caught between the ends of the vanes and the surface of shell 22. In both cases, the scraping of the walls of the equipment also serves to maintain effective heat transfer. Again, this milling action may be effected when the inner vanes have a length such that they are approximately two millimeters from the inner wall of the hull 14. Although the vanes shown are triagular in configuration, it should be understood that any other suitable configuration or means may be employed.

The jacketed hull 14 has an inlet port 15 through which cuttings may be loaded into the separator. Although not shown, the inlet port may include a pipe within a pipe arrangement. The annular space between the inner pipe and the outer pipe may be filled with any suitable packing including Rachig rings. The packing may be supported by a suitable metal screen. With this configuration, entrainment of any particulate matter into the vacuum line 15*a*, through which hydrocarbon vapors are drawn, may be minimized. Also, cuttings may be loaded into the system through port 15 without having to pass through the packing.

The line surrounding the packing should be heated to preclude any condensation. It is also preferrable that at least a portion of the line between the point where hydrocarbon vapors are withdrawn and the point where those vapors are condensed be heated by any suitable means to preclude any hydrocarbons from condensing and flowing back into the separator.

The jacketed hull 14 also has an outlet port 16 through which clean cuttings may be withdrawn.

The jacketed hull 14 may be heated by introducing a heated fluid into port 22*a* and circulating it through the jacketed portion 23 of the hull 14 and out the outlet port 24. In the preferred embodiment, the jacketed space 23 may be filed with a heatable material having a relatively low coefficient of expansion and good heat transfer qualities such as Woods metal 37. Once the jacketed space 23 is filled with Woods metal, the inlet and outlet ports 22 may be blocked off. The jacketed space 23 may then be penetrated by suitable electrical heating coils 35 to heat the Woods metal and thereby transfer heat to the cuttings contained within the hull. The heating coils shown in the drawings may be of any suitable type well-known in the art and they may be mounted through the exterior wall of the hull and through the jacket space 23.

Woods metal is an alloy which according to p. 772 of the 1946 edition of the HANDBOOK OF CHEMISTRY edited by N. A. Lange and published by Handbook Publisher, Inc. consists of 50% Bismuth, 25% lead, 12.5% tin and 12.5% cadmium. Tha reference also states that the alloy has a specific gravity of 9.7 and a melting point between 70°–72° C. Woods metal is preferred because of its small coefficient of expansion and because it is safer than circulating thermal oil for heat. No separate receptacle is required to provide for the expansion of the alloy but small holes, for example, 5 mm. in diameter, should be drilled through the exterior wall of the jacketed hull to allow for any expansion of the Woods metal. It should be understood that while it is preferred to employ Woods metal for heating, any other material or means of heating the hull, e.g. steam circulation, may be employed.

The inner drum 19 is rotatably mounted in and through the jacketed hull. The drum 19 consists of an outer shell 22 which is located within the jacketed hull and which is affixed by weld or other means to a shaft 23*a*. The shaft 23*a* has an inlet port 24*a* through which a heated fluid may be pumped and circulated through holes 25 into the void space 26. The fluid exits the void space through holes 27 and exits the shaft through the annular space 28. The heated fluid which exits the annular space 28 may be reheated and reintroduced into the system. The same fluid used to heat the inner drum may be used to heat the jacketed hull.

In the preferred embodiment, the void space 26 may be paritally filled, less than halfway, with Woods metal. The Woods metal may be heated by use of electrical heating coils which are rotatable with the shaft and which extend through either the inlet port 24 or the annular space 28. Electrical contact during the rotation of the inner drum 19 may be maintained by means of a suitable commutator coupling as is well-known in the art. Alternatively, the heatings coils may be stationary and the shaft can be rotated about them.

The interior of the hull may be sealed against air leaks by use of suitable seals 29 having packing 30, which seals ride on sleeve bearings 29*a*. The seals should be of any suitable high temperature type and the packing material may be of any suitable type such as woven graphite. The maximum temperature tolerable by the seals may limit the maximum operating temperature of the vessel.

It should be recognized that not only the hydrocarbons may be recovered and used for other purposes but barite may be separated from the clean cutting by any suitable process including a cyclone separation process.

The inner drum may be rotated by any suitable means such as by a turbine or a motor. The motor must be of a sufficient size to turn the inner drum in order to mill the cuttings.

In practical use the apparatus described herein can be mounted on a skid along with the other devices needed to carry out the described method. Also, in practical use the apparatus should be insulated to prevent heat loss. A generator may also be provided to provide the energy for the motor and for the heaters if need be.

The following tests were conducted on an embodiment of the apparatus of the instant invention. The apparatus used Woods metal and electrical coils for heating. A water ring pump was utilized to reduce the internal pressure of the separator and to remove the vaporized hydrocarbons. The separator had the following specifications:

Power for motor—5 Kw
Power for heating—16-25 Kw
Capacity of vessel—approx. 5 gals.
Speed of internal drum—100 RPM.

TEST I

Cutting from a rotary drilling operation in Bea County, Texas were utilized and an analysis made in accordance with API RP 138 resulted in the following data on the contaminated cuttings:

Solids—62.4%
Water—11.6%
Oil—26.0%

Approximately 25 lbs. of these cuttings were added to the separator. The inner drum with the vanes mounted thereon was rotated periodically during the test to mill the cuttings. The initial operating conditions were: 70° F. and 1.5 psia. The cuttings remained in the unit for 2 hours and 20 minutes before reaching the final conditions of 510° F. and 0.8 psia.

Analysis of the clean cuttings was made by the conventional room temperature hexane extraction technique. This technique is used because the API technique gives a false reading because of the cracking of asphalts. The amount of residual oil was 0.16 wt. %.

TEST II

Cuttings from a rotary drilling operation in Signal Hill, California were utilized and the initial test (conducted as in TEST I) showed:

Solids—74.3% (wt.)
Water—14.8% (wt.)
Oil—10.9% (wt.)

Approximately 20 lbs. of these cuttings were added to the separator. The inner drum was rotated periodically during the test to mill the cuttings. The initial conditions were: 420° F. and 1.5 psia. The test lasted for 40 minutes and the final conditions were: 490° F. and 1.8 psia. The residual oil content (determined as in TEST I) was 0.02 wt. %.

TEST III

Cuttings from a rotary drilling operation in Marsh Island, California were utilized and the initial test (conducted as in TEST I) showed:

Solids—75.5% (wt.)
Water—4.7% (wt.)
Oil—19.8% (wt.)

Approximately 30 lbs. of these cuttings were added to the separator. The inner drum was rotated periodically during the test to mill the cuttings. The initial conditions were: 500° F. and 1.5 psia. The test lasted for 10 minutes and the final conditions were: 525° F. and 1.0 psia. The residual oil content (determined as in TEST I) was 0.03 wt. %.

The test results show that substantially all hydrocarbons can be removed from cuttings in a relative short period of time. These tests also show that the pressure of the separator may be as low as 0.8 psia but it should be understood that even lower pressures may be achieved with different equipment and conditions. Also, it should be apparent that the length of time for each run is dependent upon many factors including the type of cuttings, the pressure of the system and the initial and final temperature of the system.

Although the description of the preferred embodiment has reference to the removal of hydrocarbons from drill cuttings, it should be appreciated that the instant invention may also be used for the removal of oil from other earthy materials including sand, dirt or other sedimentitious material. It should also be appreciated that when the hydrocarbons are removed from the cuttings other contaminates such as water and other constituents of the drilling fluid will also be removed. It should be understood that lower temperatures and/or lower vacuum may be used with lighter hydrocarbons (those that boil at a lower temperature).

The description of the preferred embodiment was not intended to limit the scope of the invention. Various modification of the disclosed embodiments of the invention, may be apparent to persons skilled in the art upon reference to this disclosure. It is therefore, contemplated that the appended claims cover any such modifications or embodiments as fall within the true scope of this invention.

What is claimed is:

1. Apparatus for the removal of hydrocarbon values from drill cuttings from a drilling well which comprises:

a pressure vessel adapted for the introduction of and for the removal of hydrocarbon contaminated drill cuttings;

means to reduce the pressure within said vessel below atmospheric pressure;

means to heat the interior of said vessel to a temperature sufficient to vaporize substantially all of said hydrocarbons, said heat means including an enclosed space adjacent the vessel, Woods metal positioned in said space, and electrical heating means in said space for heating the Woods metal for transferring heat to cuttings in the vessel;

milling means within said vessel for shearing agglomerates of said drill cuttings to expose hydrocarbons contained within said agglomerates;

said milling means comprises at least two sets of members which move relative to each other for shearing the drill cuttings, said milling means including a rotor rotatable in said vessel, said members being generally triangular in shape, one set of said members having one of their corners rigidly connected to the interior of the vessel and extending to the outside of the rotor for cleaning the rotor, the other set of members having one of their corners rigidly connected to the rotor and extending to the interior surface of the vessel for cleaning said interior vessel surfaces, and an exit port for the removal of vaporized hydrocarbons.

2. The apparatus of claim 1 wherein the enclosed space is positioned in the rotor thereby isolating the heat means from the environment surrounding the apparatus.

3. Apparatus for the removal of hydrocarbon values from drill cuttings which comprises:

a pressure vessel adapted for the introduction of and for the removal of hydrocarbon contaminated drill cuttings;

means to reduce the pressure within said vessel below atmospheric pressure;

heating means for heating the interior of said vessel to a temperature sufficient to vaporize substantially all of said hydrocarbons;

milling means within said vessel for shearing agglomerates of said drill cuttings to expose hydrocarbons contained within said agglomerates and for cleaning the inside of said vessel, said milling means includes a rotor rotatable in said vessel and at least two sets of members which move relative to each other for shearing the drill cuttings, said members being generally triangular in shape, one set of said members having one of their corners rigidly connected to the interior of the vessel and extending to the outside of the rotor for cleaning the outside of the rotor, the other set of said members having one of their corners rigidly connected to the rotor and extending to the interior surface of the vessel for cleaning said interior vessel surfaces; and an exit port for the removal of vaporized hydrocarbons.

* * * * *